(12) United States Patent
Zhang et al.

(10) Patent No.: US 10,302,130 B2
(45) Date of Patent: May 28, 2019

(54) SELF-LUBRICATING FABRIC AND PRODUCTION METHOD AND USE THEREOF

(71) Applicant: TORAY INDUSTRIES, INC., Tokyo (JP)

(72) Inventors: Youjuan Zhang, Jiangsu (CN); Shunqing Ji, Jiangsu (CN); Junqi He, Jiangsu (CN)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/749,673

(22) PCT Filed: Aug. 3, 2016

(86) PCT No.: PCT/CN2016/092984
§ 371 (c)(1),
(2) Date: Feb. 1, 2018

(87) PCT Pub. No.: WO2017/020821
PCT Pub. Date: Feb. 9, 2017

(65) Prior Publication Data
US 2018/0223903 A1    Aug. 9, 2018

(30) Foreign Application Priority Data

Aug. 5, 2015 (CN) .......................... 2015 1 0475321

(51) Int. Cl.
| | |
|---|---|
| F16C 33/20 | (2006.01) |
| D02G 3/04 | (2006.01) |
| D02G 3/26 | (2006.01) |
| D03D 13/00 | (2006.01) |
| D06M 17/04 | (2006.01) |

(52) U.S. Cl.
CPC .......... *F16C 33/201* (2013.01); *D02G 3/045* (2013.01); *D02G 3/26* (2013.01); *D03D 13/00* (2013.01); *D06M 17/04* (2013.01); *F16C 33/208* (2013.01); *D03D 2700/0174* (2013.01); *D10B 2321/042* (2013.01); *D10B 2401/00* (2013.01); *F16C 2208/32* (2013.01); *F16C 2208/34* (2013.01); *Y10S 384/911* (2013.01); *Y10T 29/49668* (2015.01)

(58) Field of Classification Search
CPC ...... F16C 27/02; F16C 33/201; F16C 33/208; F16C 2208/32; F16C 2208/34; F16C 2208/82; D02G 3/045; D02G 3/26; D02D 3/02; D03D 13/00; D03D 11/00; D03D 15/00; D03D 2700/137; D03D 2700/174; D06M 17/04; D10B 2321/042; D10B 2401/00; Y10T 29/49668; Y10S 384/911
USPC .............. 384/276, 282, 298, 300, 606, 911; 139/420 R, 426 TW, 450; 428/36.1, 39.2; 442/202, 208, 209
See application file for complete search history.

(56) References Cited

U.S. PATENT DOCUMENTS

| | | | | |
|---|---|---|---|---|
| 2,919,219 | A * | 12/1959 | Smith ..................... | B29C 70/22 156/250 |
| 3,000,076 | A * | 9/1961 | Runton .................. | D03D 49/36 138/123 |
| 3,804,479 | A | 4/1974 | Butzow et al. | |
| 3,864,197 | A | 2/1975 | Shobert | |
| 5,360,275 | A * | 11/1994 | Harris .................. | B29D 23/001 384/420 |
| 5,417,499 | A * | 5/1995 | Jacques .................... | F16C 33/20 384/298 |
| 5,843,542 | A * | 12/1998 | Brushafer ............... | F16L 11/02 428/36.1 |
| 6,328,080 | B1 * | 12/2001 | Winters ................. | D03D 19/00 138/168 |
| 7,121,306 | B2 * | 10/2006 | Harrison ............... | D03D 11/00 139/440 |
| 7,216,678 | B2 * | 5/2007 | Baer ........................ | D03D 3/08 139/383 R |
| 8,021,051 | B2 * | 9/2011 | James ................ | B60G 21/0551 384/276 |
| 9,400,013 | B2 * | 7/2016 | Bell ........................ | F16C 33/20 |
| 9,404,204 | B2 * | 8/2016 | Itoh ........................ | B60R 16/02 |
| 2005/0141791 | A1 * | 6/2005 | Roos ....................... | F16C 33/04 384/300 |
| 2006/0054346 | A1 * | 3/2006 | Gladfelter ................. | F16L 3/26 174/74 A |
| 2012/0178327 | A1 | 7/2012 | Ogoe et al. | |
| 2015/0362016 | A1 * | 12/2015 | Bell ...................... | F16C 33/201 384/300 |
| 2015/0362017 | A1 * | 12/2015 | Bell ........................ | F16C 33/20 384/300 |

FOREIGN PATENT DOCUMENTS

| | | | |
|---|---|---|---|
| CN | 1259599 A | 7/2000 | |
| CN | 102535167 A | 7/2012 | |
| CN | 102597073 A | 7/2012 | |
| CN | 202597472 U | 12/2012 | |
| CN | 103572454 A | 2/2014 | |
| CN | 103849988 A | 6/2014 | |
| GB | 315606 A * | 7/1929 | ............ D02G 3/365 |
| JP | 62079112 A | 4/1987 | |

OTHER PUBLICATIONS

International Search Report and Written Opinion for International Application No. PCT/CN2016/092984, dated Oct. 31, 2016—5 pages.

* cited by examiner

*Primary Examiner* — Marcus Charles
(74) *Attorney, Agent, or Firm* — RatnerPrestia

(57) ABSTRACT

A self-lubricating fabric contains warp yarns or weft yarns that are composite yarns formed from fluorinated resin yarns and other yarns. The surface area of the other yarns on one surface of the fabric takes up 0 to 30% of the total surface area of the composite yarns, and the ratio of the section diameter of the other yarns to the section diameter of the fluorinated resin yarns in the composite yarns is 0.12 to 0.80. A method for producing the self-lubricating fabric and use of the self-lubricating fabric are also disclosed.

14 Claims, No Drawings

SELF-LUBRICATING FABRIC AND PRODUCTION METHOD AND USE THEREOF

CROSS REFERENCE TO RELATED APPLICATIONS

This is the U.S. National Phase application of PCT/CN2016/092984, filed Aug. 3, 2016, which claims priority to Chinese Patent Application No. 201510475321.1, filed Aug. 5, 2015, the disclosures of these applications being incorporated herein by reference in their entireties for all purposes.

TECHNICAL FIELD OF THE INVENTION

The present invention relates to a self-lubricating fabric and production method and use thereof.

BACKGROUND OF THE INVENTION

At present, conventional bearings that use lubricant or lubricating grease for lubrication during their operation have great limitations in some special occasions of use. For example, for bearings for underwater operation, the lubricant or lubricating grease replenishment, maintenance and so on are very difficult. Besides, if conventional lubricant or lubricating grease is used in equipment for producing food or drug, etc., the products may be contaminated easily, resulting in unqualified products. In addition, for mechanical equipment used in high dusty environment, such as some equipment in industrial and mining enterprises will operate under very harsh conditions, many problems will be brought to the normal use of the mechanical equipment if the conventional lubrication method is used, resulting in severe frictional wear or even damage or failure of the moving parts. Therefore, it is necessary to develop a self-lubricating fabric that can be applied to mechanical moving parts in replacement of conventional lubricant and lubricating grease.

As the science and technology is developed rapidly, oil-free lubrication bearings that employ pure polytetrafluoroethylene resin (PTFE resin) as pressed faces have been developed successively. However, in the actual application process, since PTFE has very low surface energy and the strength of bonding with the metal substrate material is poor, the PTFE layer may flake off easily when using; besides, since PTFE resin has a drawback of cold flow and may be deformed irreversibly under the action of external force, the PTFE resin layer may be worn out easily when PTFE resin is used as a self-lubricating material in a bearing. Especially, under high load operating conditions, the bearing may be fractured easily, and even may threaten the life safety of the operator.

For example, in Chinese Patent Document No. CN102535167A, a self-lubricating composite material liner for bearing and a producing method thereof are disclosed. The self-lubricating composite material liner is a fiber fabric woven from PTFE fibers and at least one other fiber, with an impregnating material clad on the surface of the fiber fabric woven. Though the impregnating material attains an effect of reducing friction and wear, the impregnating material is clad on the entire fiber fabric woven through a spreading-rolling process. As a result, the surfaces of the PTFE fibers are impregnated with resin. Consequently, the self-lubricating property is degraded, and the molybdenum disulfide, nanometer alumina, and super-fine fluorinated resin powder constituents in the impregnating material are difficult to be uniformly distributed in the fiber fabric woven, resulting in instable abrasion proof of the self-lubricating composite material liner and therefore affecting the long-time stable use of the bearing.

In Chinese Patent Document No. CN102597073A, a sliding surface material and a multi-layer sliding part having the sliding surface material is disclosed. The sliding surface material is formed by impregnating phenolic resin into a reinforcing substrate formed from a woven fabric, wherein, the woven fabric is formed of warp yarns and weft yarns, which are twisted yarns obtained by doubling and twisting a single twist yarn that contains fluororesin fibers and a single twist yarn that contains polyester fibers. Though the invention realizes low swelling property in wet environment (e.g., water) and frictional wear property under the same conditions, the yarns used for the reinforcing substrate of the sliding surface material are produced by doubling and twisting a single twist yarn of fluororesin fibers and a single twist yarn of polyester fibers, which are equivalent to each other in terms of diameter. Consequently, the fluororesin fibers and polyester fibers are exposed in almost the same proportion on a side of the material. Then, since the proportion of fluororesin fibers in the sliding surface is low, the self-lubricating property of the sliding surface material is affected directly, the local temperature will be increased rapidly during friction, and the wearing of the sliding part will be accelerated.

In Japanese Patent Document No. 1987-79112, a belt that is of a conveyer belt type is disclosed. The surface of the belt is provided with reinforcing fabric texture formed from PTFE fibers and/or a PTFE fiber layer containing heat-resistant fibers. Though the belt in the invention has good anti-stripping performance, excellent heat resistance performance, and elongation resistance performance, when it is used to convey objects, a core-sheath yarn structure and a double-layer fabric texture scheme have to be used to attain those effects. The core-sheath yarn structure employs PTFE fibers for sheath yarn and heat-resistant fibers for core yarn, and the core-sheath yarns are used as surface warp yarns in the weaving process. Consequently, the thickness of the resultant fabric is too great, and the overall deformation of the fabric is severe under the action of external force, causing compromised dimensional stability. Besides, in the weaving process, relative slippage between the core yarn and the sheath yarn may occur in the surface warp yarns and consequently the core yarns may be exposed under the action of external force in the beam-warping and weaving procedures. When the belt is used to convey objects, the belt may adhere to the conveyed objects, resulting in product failure.

SUMMARY OF THE INVENTION

An object of the present invention is to provide a self-lubricating fabric that has low friction coefficient, excellent wear resistance property, and high laminating strength.

Another object of the present invention is to provide a method for producing a self-lubricating fabric, which employs a simple production process, and has low cost and zero pollution to the environment.

To attain the above objects, the self-lubricating fabric provided in embodiments of the present invention has the following composition:

(1) The warp yarns or weft yarns of the self-lubricating fabric are composite yarns formed from fluorinated resin yarns and other yarns, the surface area of the other yarns on one surface of the fabric takes up 0 to 30% of the total surface area of the composite yarns, and the ratio of the section diameter of the other yarns to the section diameter of the fluorinated resin yarns in the composite yarns is 0.12 to 0.80.

(2) In the fabric described in the above item (1), the exposed length of the other yarns on the self-lubricating surface of the fabric is 2.5 mm or smaller.

(3) In the self-lubricating fabric described in the above item (2), the surface area of the other yarns on one side of the self-lubricating fabric takes up 2 to 30% of the total surface area of the composite yarns, and the exposed length of the other yarns on the self-lubricating surface of the fabric is 0.1 to 2.5 mm.

(4) In the self-lubricating fabric described in any one of the above items (2) to (3), the surface area of the other yarns on one side of the self-lubricating fabric takes up 5 to 30% of the total surface area of the composite yarns, and the exposed length of the other yarns on the self-lubricating surface of the fabric is 0.2 to 2 mm.

(5) In the self-lubricating fabric described in the above item (1), the fluorinated resin yarns are yarns formed from any one of polytetrafluoroethylene (PTFE), dissoluble PTFE (PFA), polyvinylidene difluoride (PVDF), fluorinated ethylene propylene (FEP), ethylene-tetrafluoroethylene copolymer (ETFE), and polytrifluorochloroethylene (PCTFE) resin.

(6) In the self-lubricating fabric described in the above item (1), the total fineness of the other yarns in the composite yarns is 5 to 300 dtex.

(7) In the self-lubricating fabric described in the above item (1), the twist of the composite yarns is 100 to 500 T/m.

(8) The compression elasticity of the self-lubricating fabric described in the above item (1) is 85 to 95%.

(9) The shear stiffness of the self-lubricating fabric described in the above item (1) is 5 to 15 gf/cm·deg.

(10) In the self-lubricating fabric described in the above item (1), the absolute difference between the dynamic friction coefficient in the warp direction and the dynamic friction coefficient in the weft direction is 0 to 0.05.

(11) The continuous abrasion lifetime of the self-lubricating fabric described in the above item (1) is 100 to 400 h.

The present invention may attain the following beneficial effects: the self-lubricating fabric is characterized by low friction coefficient, excellent wear resistance property and high laminating strength, as well as simple production process, low cost and zero pollution to the environment. The fabric with low friction coefficient can be applied to mechanical moving parts. In addition, according to the selective use of the other yarns in the composite yarns, the self-lubricating fabric may be used under different operating conditions as appropriate, such as heavy-load and low-speed condition, medium-load and medium-speed condition, and light-load and high-speed condition, etc., especially under extreme operating conditions such as high or low temperature, dust or liquid condition, etc.

DETAILED DESCRIPTION OF EMBODIMENTS OF THE INVENTION

The warp yarns or weft yarns of the self-lubricating fabric provided in embodiments of the present invention are composite yarns formed from fluorinated resin yarns and other yarns, the surface area of the other yarns on the surface side or back side of the fabric takes up 0 to 30% of the total surface area of the composite yarns, and the ratio of the section diameter of the other yarns to the section diameter of the fluorinated resin yarns in the composite yarns is 0.12 to 0.80. If both the warp yarns and weft yarns of the self-lubricating fabric use fluorinated resin yarns, a fabric layer formed of fluorinated resin yarns will exist on both sides of the resultant self-lubricating fabric. The self-lubricating fabric must be bonded to the mechanical moving part when the self-lubricating fabric is used, but the laminating strength of fluorinated resin yarns with the bonding agent is poor owing to low surface energy of the fluorinated resin yarns; especially, under friction with external force, the self-lubricating fabric may be stripped off easily from the mechanical part at the bonding position and fall off, thereby resulting efficacy-losing of the self-lubricating fabric. If both the warp yarns and weft yarns of the self-lubricating fabric use other yarns except fluorinated resin yarns, for example, if both the warp yarns and weft yarns use polyphenylene sulfide yarns or cotton yarns, a fabric layer formed of the other yarns except for fluorinated resin yarns will exist on both sides of the resultant self-lubricating fabric. The self-lubricating fabric suffers friction with the counter surface when using the self-lubricating fabric, and other yarns except for fluorinated resin yarns can't form a self-lubricating layer that attains a friction reduction effect on the surface layer of the friction counter surface as well as the high friction coefficient of the yarns except for fluorinated resin yarns, therefore, the coefficient of friction between the self-lubricating fabric and the counter surface is increased and the temperature of the friction part is increased sharply. Consequently, the wearing of the fabric is accelerated, so that the self-lubricating fabric losses efficiency. In the case that one side of the fabric is working as a self-lubricating fabric, as a friction surface, if the surface area of the other yarns on the one surface of the fabric (friction surface) takes up 30% or more of the total surface area of the composite yarns (i.e., the percentage of the fluorinated resin yarns in the friction surface is decreased), the self-lubricating property of the fabric will be reduced and the friction coefficient will be increased owing to the frictional wearing producing by the action of external force when the fabric is applied to a bearing. Consequently, the wearing of the self-lubricating fabric is aggravated, and even the bearing may be damaged. The percentage of the surface area of the other yarns to the total surface area of the composite yarns is calculated with the following formula: $S=S_2/(S_1+S_2)\times 100\%$, where, $S_1$ is the surface area of the fluorinated resin yarns, and $S_2$ is the surface area of the other yarns. If the composite yarns employ other fineness yarns as reinforcing yarns and employ coarse denier fluorinated resin yarns as functional yarns for obtaining self-lubricating property and are processed through doubling and twisting the other yarns and the fluorinated resin yarns, composite yarns in which the percentage of the surface area of the other yarns to the total surface area of the composite yarns is 0% can be obtained. In the case that the percentage of the surface area of the other yarns to the total surface area of the composite yarns is 0%, the surfaces of the composite yarns will be fully covered by the fluorinated resin yarns. Thus, when the fabric is used as a self-lubricating surface, the consecutive fluorinated resin yarns can form a continuous and uniform fluorinated film layer more easily under the action of friction force and cover the other yarns and under-layer yarns in the composite yarns uniformly in the process of relative friction movement with the counter wearing material, and thereby effectively protect the other yarns and under-layer yarns against wearing under the action of external force, attain a better reinforcement effect. Thus, the fabric provided in the present invention may attain a self-lubricating effect, with excellent wear resistance property and low friction coefficient. In the case of core-sheath composite yarns or covered yarns, which are obtained through a process in which other yarns are used as core yarns and fluorinated resin yarns are used as sheath yarns, the outer fluorinated resin yarns have to be treated by false-twist texturing and twined in layers on the surface of the core yarns, in order to attain an effect that the core yarns are fully covered. When the covering yarns are used as warp yarns, the friction between the fluffy fluorinated resin yarns in the outer layer and the mechanical may be aggravated in the beam-warping and weaving procedures, and the fluorinated resin yarns may be fluffed easily, resulting in uneven shedding and fabric flushing, and even yarn breaking at severe fluffy positions and weaving failure; when the covering yarns are used as weft yarns, some filaments may not be stressed during weft insertion under the friction with the pigtail guide and weft accumulator, resulting in flaws such as slack weft yarns on the surface of the fabric. In the fabric formed of the covering yarns, since the fluorinated resin yarns float and form loop constructions on the self-lubricating surface of the fabric, the self-lubricating surface is not smooth, and the friction force is increased, resulting in aggravated wearing. In addition, in consideration of the possibility of untwisting owing to unwinding in the beam-warping and weaving procedures of the composite yarns, the percentage of the surface area of the other yarns to the total surface area of the composite yarns preferably is 2 to 30%, more preferably is 5 to 30%.

The ratio of the section diameter of the other yarns to the section diameter of the fluorinated resin yarns in the composite yarns that form the self-lubricating fabric in embodiments of the present invention is 0.12 to 0.80. In view that the other yarns have high density, it is more suitable to measure the thickness relationship between the other yarns and the fluorinated resin yarns by section diameter ratio. According to the calculation method of fiber section diameter, under a condition of the same fineness, the section diameter of glass fibers that have higher density is smaller than the section diameter of other fibers that have ordinary density. For example, the density of glass fibers of 400 dtex fineness usually is 2.4 to 2.7 $g/cm^3$, and the section diameter is 137 to 145 μm; in contrast, the density of polyester fibers of the same fineness (440 dtex) is 1.38 $g/cm^3$, and the section diameter is 192 μm, higher than the section diameter of the glass fibers by about 40%. Therefore, for fibers with higher density, such as glass fibers, the ratio of the section diameter of the other yarns to the section diameter of the fluorinated resin yarns in the composite yarns is 0.12 to 0.80, preferably is 0.20 to 0.70. If the ratio of the section diameter of the other yarns to the section diameter of the fluorinated resin yarns in the composite yarns is lower than 0.12, the strength of the obtained fabric will be too low, and the reinforcing effect to the strength of the fluorinated resin yarns in the self-lubricating fabric will be degraded, resulting in degraded overall abrasion proof of the self-lubricating fabric; if the ratio of the section diameter of the other yarns to the section diameter of the fluorinated resin yarns in the composite yarns is higher than 0.80, after the other yarns are composited with the fluorinated resin yarns, the percentage of the surface area of the other yarns to the total surface area of the composite yarns will be increased; consequently, the friction coefficient of the fluorinated resin yarn layer will be increased, the wearing of the self-lubricating fabric will be aggravated, and even damages to the bearing may occur.

The exposed length of the other yarns on the self-lubricating surface of the self-lubricating fabric in embodiments of the present invention is 2.5 mm or smaller. If the exposed length of the other yarns on the self-lubricating surface of the self-lubricating fabric is 2.5 mm or smaller, under the interaction between the self-lubricating surface and the counter wearing surface, the fluorinated resin yarns will be squeezed and extended under the action of external force, part of fragmented fluorine detritus will be squeezed into the texture voids of the self-lubricating fabric, and the other part of the fluorine detritus will uniformly cover the friction surface, including the surfaces of exposed other yarns, under the external force, and thereby form a fluorinated film layer; in addition, the fluorinated film layer will be transferred toward the friction counter surface. As a result, the friction actually becomes friction between the fluorinated film layers, and thereby an excellent effect of low friction coefficient and long abrasion lifetime in the friction process is attained. If the exposed length of the other yarns is greater than 2.5 mm, the relative length of the other yarns that serve as the friction surface will be increased, i.e., the relative length of the fluorinated resin yarns that serve as the friction surface will be decreased; consequently, the film-forming property of the fluorinated resin yarns on the friction surface of the self-lubricating fabric will be affected, and it will be difficult to form a continuous fluorinated film on the surface of the other yarns. As a result, when the self-lubricating fabric is applied to moving parts, e.g., a bearing, the friction coefficient will be increased owing to frictional wearing under the action of external force, the self-lubricating property of the fabric will be degraded, the wearing of the self-lubricating fabric will be aggravated, and even damages to the bearing may occur. In view of the possibility of untwisting of the composite yarns in the beam-warping and weaving procedures, the exposed length of the other yarns preferably is 0.1 to 2.5 mm, more preferably is 0.2 to 2 mm.

The fluorinated resin yarns in embodiments of the present invention are obtained by dispersing fluorinated resin particles in cellulose solution and treating the obtained mixed liquid by wet-spinning, sintering, and stretching. Compared with fluorinated resin yarns obtained with a tearing electret film method, which has non-uniform polygonal sections, the fluorinated resin yarns obtained through a wet-spinning process have uniform round sections, lower fineness deviation, more uniform mechanical properties, higher durability, and higher elongation property, and are very suitable for weaving self-lubricating fabrics. In contrast, fluorinated resin yarns obtained with a tearing electret film method have irregular polygonal sections, very poor fineness uniformity, and extremely low elongation property. Especially, when such fluorinated resin yarns are used to weave high-density textiles, the resultant textiles will have many flaws, and the weaving operation will be very difficult. If the fluorinated resin yarns obtained with a tearing electret film method are used to produce self-lubricating fabrics, the resultant self-lubricating fabrics will have very poor bonding strength to metal parts through bonding agent, and may be stripped off easily under external force, and can't be used normally. However if the fluorinated resin yarn obtained through a wet-spinning process in the present invention are used to produce self-lubricating fabrics, in the resultant self-lubricating fabrics, the fluorinated resin yarns on the friction surface will be fibrillated owing to friction under external force, and the fluorine fiber fragments produced under external force can form a uniform and dense fluorinated film, and the fluorinated film can be transferred toward the friction counter surface under squeezing stress to form a uniform fluorine transfer film; thus, the self-lubricating fabric and the friction counter surface can attain a relative movement with a low friction coefficient, and thereby a lubricant-free self-lubricating effect can be attained.

In the self-lubricating fabric provided in embodiments of the present invention, the fluorinated resin yarns are yarns formed from any one of polytetrafluoroethylene (PTFE), dissoluble PTFE (PFA), polyvinylidene difluoride (PVDF), fluorinated ethylene propylene (FEP), ethylene-tetrafluoro-ethylene copolymer (ETFE), and polytrifluorochloroethylene (PCTFE) resin. The fluorinated resin yarns preferably are polytetrafluoroethylene (PTFE) yarns and dissoluble PTFE (PFA) yarns, further preferably are PTFE yarns.

The other yarns in the self-lubricating fabric provided in embodiments of the present invention are any one of polyester, p-aramid, m-aramid, polyphenylene sulfide, polyimide, polybenzimidazole (PBI), and glass fiber. Any one of the above-mentioned fibers can be composited with fluorinated resin yarns to produce the self-lubricating fabric provided in the present invention, which not only has good mechanical properties, low friction coefficient and simple production process, but also can effectively reduce the production cost. In view that the fineness specification of the other yarns has direct influence on the effect of appearance obtained through compositing processing with the fluorinated resin yarns, the other fibers preferably are polyester, m-aramid, polyimide, or glass fibers. Owing to the fact that polyester yarns have high strength, and yarns with high fineness specification can be produced through a relatively simple production process at a low cost, the production cost of the fabric with low friction coefficient can be reduced remarkably. Besides, m-aramid ("polyisophthaloyl metaphenylene diamine" in full name, referred to as Aramid 1313 in China) has an outstanding heat resistance property, can be used at 220° C. in a long term without being aged, and has excellent dimensional stability. Specifically, m-aramid has thermal shrinkage as low as 1% at about 250° C., and will not shrink or not become brittle, softened or melted if it is exposed to 300° C. high temperature for a short time, and begins to decompose only if the temperature exceeds 370° C. After m-aramid is composited with fluorinated resin yarns, the obtained yarns will not deform easily in high-temperature environment and can effectively prolong the service life of the self-lubricating fabrics.

The total fineness of the other yarns in the composite yarns that form the self-lubricating fabric in embodiments of the present invention is 5 to 300 dtex, preferably is 20 to 250 dtex, more preferably is 40 to 200 dtex. If the fineness of the other yarns in the composite yarns is too low, the strength of the obtained fabric will be too low, and the reinforcing effect to the strength of the fluorinated resin yarns in the self-lubricating fabric will be degraded, resulting in degraded overall abrasion proof of the self-lubricating fabric; if the fineness of the other yarns in the composite yarns is too high, after the other yarns are composited with the fluorinated resin yarns, the percentage of the surface area of the other yarns to the total surface area of the composite yarns will be increased, resulting in increased friction coefficient of the fluorinated resin yarn layer. In the service process, the wearing with the mechanical moving part will be increased, and thereby the overall service life of the self-lubricating fabric will be shortened.

The twist of the composite yarns of the self-lubricating fabric in embodiments of the present invention is 100 to 500 T/m. If the twist of the composite yarns is too low, the covering effect of the fluorinated resin yarns to the other yarns in the composite yarn will be compromised, and the sliding performance of the resultant self-lubricating fabric will be decreased severely. When the self-lubricating fabric contacts with the mechanical moving part, the friction resistance will be increased, the self-lubricating effect will be lost, and the operating condition of the mechanical moving part will be poor; if the twist of the composite yarns is too high, the composite yarns may shrink easily in the beam-warping and weaving procedures, and the outer fluorinated resin yarns in the composite yarns in the fabric may have torsional deformation easily. Consequently, stress concentration may occur owing to friction under external force, and shear force resistance gets worse, the friction may be aggravated when working with the counter surface, and the self-lubricating fabric will be worn more quickly and even fail. In consideration of the production performance and abrasion proof of the fabric, the twist of the composite yarns in the self-lubricating fabric in the present invention preferably is 100 to 400 T/m, more preferably is 150 to 300 T/m, still more preferably is 200 to 300 T/m.

The compression elasticity of the self-lubricating fabric in embodiments of the present invention is 85 to 95%. When the self-lubricating fabric has compressive deformation in the thickness direction under external force, the thickness change of the fabric will be aggravated if the compression elasticity of the self-lubricating fabric is too low. Consequently, the fit clearance between the self-lubricating fabric and the mechanical part will be increased, the stress on the mechanical moving part will be increased, and an eccentric load phenomenon will occur. As a result, concentrated wear on the self-lubricating fabric is increased rapidly, so that the self-lubricating fabric fails; if the compression elasticity of the self-lubricating fabric is too high, the fluffiness of the fabric will be excessively high, the fabric layer will be thick, and the fabric may have compressional deformation under external force, thereby the fit clearance between the self-lubricating fabric and the mechanical part will be increased. As a result, the wear of the self-lubricating fabric may be increased, resulting in failure of the part.

The shear stiffness of the self-lubricating fabric in embodiments of the present invention is 5 to 15 gf/cm·deg. When the self-lubricating fabric and the friction counter surface are in frictional contact and move in relation, if the shear stiffness of the self-lubricating fabric is too low, the deformation resistance performance of the fabric will be decreased, the fabric maybe easy to have dimensional deformation under a shearing action in the initial service stage, and the self-lubricating fabric may even be damaged or stripped off from the metal bonding surface, resulting in damage of the mechanical moving part; if the shear stiffness of the self-lubricating fabric is too high, the rigidity of the fabric will be excessively high. Consequently, the self-lubricating fabric will be difficult to bend in the post-treatment and will be difficult to bond to the mechanical moving part, bringing inconvenience to the processing work.

The absolute difference between the dynamic friction coefficient of the self-lubricating fabric in the warp direction and the dynamic friction coefficient of the self-lubricating fabric in the weft direction is 0 to 0.05. In view that the self-lubricating fabric has friction with the friction counter surface at different angles in the service process, the self-lubricating fabric must have a relatively uniform frictional characteristic. If the absolute difference between the dynamic friction coefficient of the self-lubricating fabric in the warp direction and the dynamic friction coefficient of the self-lubricating fabric in the weft direction is too great, the friction coefficient will fluctuate severely in the friction process, which is adverse to long-term stable operation of the mechanical moving part and may easily lead to severe wear of the self-lubricating fabric in a direction in which the friction coefficient is relatively high. Consequently, the deviation of working clearance between the portions of the mechanical part will be increased, and an eccentric load phenomenon will occur, resulting in damage of the mechanical part.

The continuous abrasion lifetime of the self-lubricating fabric in embodiments of the present invention is 100 to 400 h. The longer the continuous abrasion lifetime of the self-lubricating fabric, the longer the service life of the self-lubricating fabric when the self-lubricating fabric is assembled to the mechanical moving part under the same conditions. That is helpful for reducing the production cost of the part. If the continuous abrasion lifetime of the self-lubricating fabric is too short, the overall service life of the mechanical moving part will be shortened, and the production cost of the equipment will be increased.

The method for producing the self-lubricating fabric in embodiments of the present invention comprises preparing base yarns—doubling—twisting—beam-warping—weaving—post-treatment. Specifically, the method comprises the following steps: (a) doubling a fluorinated resin yarn with other yarn, wherein, the difference between the dry-hot shrinkage of the other yarn and the dry-hot shrinkage of the fluorinated resin yarn is 0.5 to 30%; (b) twisting the fluorinated resin yarn and the other yarn in a twisting direction that is the same as the unwinding direction of the fluorinated resin yarn and of the other yarn under a condition of 50 to 600 T/m twist, to obtain a composite yarn; (c) using the obtained composite yarns as warp yarns or weft yarns, and carrying out beam-warping and weaving to obtain grey cloth; (d) processing the obtained grey cloth by scouring, water washing, drying, and thermoforming at 180 to 210° C., so as to obtain a finished product finally.

If the difference in dry-hot shrinkage between the other yarns and the fluorinated resin yarns is smaller than 0.5%, after the grey cloth woven from the composite yarns is thermoformed, the proportion of surface area of exposed other yarns in the composite yarns will be increased because the other yarns in the fabric will be affected by the shrinkage, resulting the shrinkage of the other yarns in the fabric is too close to the shrinkage of the PTFE yarns. Consequently, the friction coefficient of one side of the fabric will be increased, and the self-lubricating property of the fabric in the service process will be affected; if the difference in dry-hot shrinkage between the other yarns and the fluorinated resin yarns is greater than 30%, after the grey cloth woven from the composite yarns is thermoformed, the emboss length of the fluorinated resin yarns in the composite yarns on the surface of the fabric will be great because the shrinkage of the other yarns in the fabric is too high. Consequently, the surface smoothness of the fabric will be affected; besides, owing to the severe shrinkage of the other yarns, the strength damage of the fabric will be too severe and the overall abrasion proof of the self-lubricating fabric will be affected. Therefore, in consideration of the self-lubricating property and abrasion proof of the final product, the difference in dry-hot shrinkage between the other yarns and the fluorinated resin yarns preferably is 0.5 to 20%, more preferably is 0.5 to 10%.

The thermoforming temperature in the post-treatment is 180 to 210° C., so that the internal stress in the fabric generated in the weaving procedure can be eliminated, and the dimensional change of the fabric will be very small and the shape of the fabric will be stable when the fabric is used under that temperature range. If the thermoforming temperature is lower than 180° C., since high temperature is generated owing to friction in the service process of the fabric, the fabric may shrink and have dimensional change in shape, or even be stripped off; if the thermoforming temperature is higher than 210° C., the overall abrasion proof of the self-lubricating fabric will be affected.

Hereunder the present invention will be further detailed in Examples. The properties of the materials in the following Examples are measured with the following methods.

[Percentage of the Surface Area of the Other Yarns to the Total Surface Area of the Composite Yarns]

A 200× enlarged photograph of the fluorinated resin yarn layer (i.e., the friction surface of the self-lubricating fabric) of the self-lubricating fabric is taken, and the surface area $S_1$ of the fluorinated resin yarns and the surface area $S_2$ of the other yarns in the photograph are measured respectively. The percentage of the surface area of the other yarns is $S_2/(S_1+S_2) \times 100\%$.

[Exposed Length of the Other Yarns]

A sample of the fabric is taken, the self-lubricating surface that contains composite yarns in the fabric is observed under a digital microscope. At 50× magnification, the length values of the two ends of the other yarns in the composite yarns are measured, and the average length of the two ends of the other yarns in 200 groups is calculated as the calculation result of the exposed length of the other yarns in the fabric.

[Cross Section]

A sample of cross section of the fluorinated resin yarn is obtained with a copper plate method, and the cross section of the yarn is observed under an optical microscope.

[Fineness]

A yarn sample is wound by 100 turns on a measuring reel, in 1 m length per turn, at 120 rpm rotation speed, according to the test method specified in the subsection 8.3 in JIS L-1017-2002; then, the sample is removed from the measuring reel and knotted, and dried in an oven at 105±2° C. temperature for 2 h or longer time. Then, the sample is taken out from the oven, and weighed on a precision balance, to obtain absolute dry weight. The fineness is calculated with the following formula: $d = M' \times 10000 \times (1+Rc/100)/L$, where:

d: Fineness (dtex)
Rc: Conventional moisture regain (%)
M': Absolute dry weight of the sample (g)
L: Length of the sample (m)

[Section Diameter of Yarn]

The section diameter of the yarn is calculated with the following formula:

$$\text{Section diameter (μm)} = \frac{\sqrt{\frac{100}{3.14} * \text{fitness}(dtex)}}{\text{Density}(g/cm^3)} * 2$$

[Twist]

Composite yarns in 50 cm length are tested with an untwist-retwist method with a yarn twist tester, 5 groups of samples are tested consecutively, and the average value of the test results in the 5 times is taken as the final test result of twist of the composite yarn sample.

[Compression Elasticity]

The thickness $T_1$ of a sample is measured at 100 gf pressure on a SE-15 compression elasticity tester in a standard mode; then, the pressure is increased to 600 gf, the sample is held for 1 min., and then the thickness $T_2$ of the sample is measured; next, the pressure is removed and keep the sample for 1 min., and the thickness $T_3$ of the sample at 100 gf pressure is measured. The accuracy is 0.01 mm. The compression elasticity is calculated with the following formula:

Compression elasticity (%)=$(T_3-T_2)/(T_1-T_2) \times 100\%$.

[Shear Stiffness]

A 20 cm×20 cm sample is fixed to a flat surface of the tester by means of a fixing device. The fixing device is controlled to move from the origin position to right, so that the shearing angle is increased from 0° to 8°. Then, the fixing device is returned to the origin position and further moved to left, so that the shearing angle is increased from 0° to −8°. Next, the fixing device is returned to the origin position again. The shear stiffness is calculated with the following formula:

Shear stiffness $G(\text{gf/cm·deg}) = (Gf + Gb)/2$,

Where, Gf: 0.5° to 5° inclination;
Gb: −5° to −0.5° inclination

[Dynamic Friction Coefficient]

The test is performed on a friction coefficient tester (model: IT-RC, from INTEC). The testing method is as follows: A 50 mm×150 mm sample is closely attached and fixed to a friction table, and a piece of SUS304BA metal plate is used as the friction counter material. 250 g weight is applied to the friction table, and the test is carried out at 50 ram/min. speed. 5 groups of data of the sample are obtained in warp direction and weft direction respectively, and the average value of the test results in the 5 times is taken as the final test result of the sample. The friction coefficient is calculated with the following formula:

$\mu = f/N$ $\mu$: Dynamic friction coefficient
f: Dynamic friction force (N)
N: Normal pressure borne on the sample (N)

[Abrasion Lifetime]

The test is performed on an abrasion tester according to the test method specified in JIS K7218. The testing method is as follows: A fabric sample in 70 mm diameter is fixed on a sample table of the abrasion tester, the friction counter material for the sample is a hollow metal ring with 0.03 to 0.05 μm average surface roughness, and the effective contact area between the ring and the sample is 600 mm², the test load is set to 12000 N, and the test is carried out at 40 rpm speed (about 3 m/min. of linear speed). 5 groups of data are obtained, and the average value of the test results in 5 times is taken as the final test result of the sample.

EXAMPLE 1

Composite yarns obtained by doubling PTFE filament yarns with round section and polyester filament yarns with round section (the difference in dry-hot shrinkage between the polyester filament yarns and the PTFE filament yarns is 9.5%) and twisting in a twisting direction that is the same as the unwinding direction of the polyester filament yarns and of the PTFE filament yarns under a condition of 210 T/m twist are used as warp yarns; polyester yarns of 26 s/2 (454 dtex) fineness are used as weft yarns; the obtained warp yarns and weft yarns are treated by beam-warping and woven on a rapier loom to obtain warp faced satin grey cloth; the obtained grey cloth is post-treated by scouring, water washing, drying, and thermoforming at 190° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 2

PPS filament yarns of 220 dtex fineness are used as warp yarns; composite yarns obtained by doubling PFA filament yarns with round section and PPS filament yarns with round section (the difference in dry-hot shrinkage between the PPS filament yarns and the PFA filament yarns is 6.2%) and twisting in a twisting direction that is the same as the unwinding direction of the filament yarns under a condition of 200 T/m twist are used as weft yarns; the obtained warp yarns and weft yarns are treated by beam-warping and woven on a rapier loom to obtain weft faced twill grey cloth; the obtained grey cloth is post-treated by scouring, water washing, drying, and thermoforming at 200° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 3

Composite yarns obtained by doubling PTFE filament yarns with round section and m-aramid yarns with round section (the difference in dry-hot shrinkage between the m-aramid yarns and the PTFE filament yarns is 0.6%) and twisting in a twisting direction that is the same as the unwinding direction of the m-aramid yarns and of the PTFE filament yarns under a condition of 260 T/m twist are used as warp yarns; m-aramid yarns of 40 s (147 dtex) fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 210° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 4

Glass fiber filament yarns of 220 dtex fineness are used as warp yarns; composite yarns obtained by doubling PVDF filament yarns with round section and glass fiber filament yarns with round section (the difference in dry-hot shrinkage between the glass fiber filament yarns and the PVDF filament yarns is 1.2%) and twisting in a twisting direction that is the same as the unwinding direction of the glass fiber filament yarns and of the PVDF filament yarns under a condition of 140 T/m twist are used as weft yarns; the obtained warp yarns and weft yarns are treated by beam-warping and woven on a rapier loom to obtain weft faced twill grey cloth; the obtained grey cloth is post-treated by scouring, water washing, drying, and thermoforming at 200° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 5

Composite yarns obtained by doubling PEP filament yarns with round section and polyester filament yarns with round section (the difference in dry-hot shrinkage between the polyester filament yarns and the FEP filament yarns is 12.4%) and twisting in a twisting direction that is the same as the unwinding direction of the filament yarns under a condition of 160 T/m twist are used as warp yarns; polyester filament yarns of 240 dtex fineness are used as weft yarns; the obtained warp yarns and weft yarns are treated by beam-warping and woven on a rapier loom to obtain warp faced satin grey cloth; the obtained grey cloth is post-treated by scouring, water washing, drying, and thermoforming at 180° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 6

P-aramid filament yarns of 220 dtex fineness are used as warp yarns; composite yarns obtained by doubling ETFE filament yarns with round section and p-aramid filament yarns with round section (the difference in dry-hot shrinkage between the p-aramid filament yarns and the ETFE filament yarns is 3.8%) and twisting in a twisting direction that is the same as the unwinding direction of the p-aramid filament yarns and of the ETFE filament yarns under a condition of 80 T/m twist are used as weft yarns; the obtained warp yarns and weft yarns are treated by beam-warping and woven on a rapier loom to obtain weft faced satin grey cloth; the obtained grey cloth is post-treated by scouring, water washing, drying, and thermoforming at 190° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 7

Composite yarns obtained by doubling PTFE filament yarns with round section and m-aramid yarns with round section (the difference in dry-hot shrinkage between the m-aramid yarns and the PTFE filament yarns is 0.9%) and twisting in a twisting direction that is the same as the unwinding direction of the above yarns under a condition of 220 T/m twist are used as warp yarns; m-aramid yarns of 60 s (98 dtex) fineness are used as weft yarns; the obtained warp yarns and weft yarns are treated by beam-warping and woven on a rapier loom to obtain weft faced twill grey cloth; the obtained grey cloth is post-treated by scouring, water washing, drying, and thermoforming at 200° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 8

Polyimide yarns of 40 s (147 dtex) fineness are used as warp yarns; composite yarns obtained by doubling PTFE filament yarns with round section and polyimide yarns with round section (the difference in dry-hot shrinkage between the polyimide yarns and the PTFE filament yarns is 2.1%) and twisting in a twisting direction that is the same as the unwinding direction of the above yarns under a condition of 250 T/m twist are used as weft yarns; the obtained warp yarns and weft yarns are treated by beam-warping and woven on a rapier loom to obtain weft faced satin grey cloth; the obtained grey cloth is post-treated by scouring, water washing, drying, and thermoforming at 210° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 9

Composite yarns obtained by doubling PTFE filament yarns with round section and polyester filament yarns with round section (the difference in dry-hot shrinkage between the polyester filament yarns and the PTFE filament yarns is 28.5%) and twisting in a twisting direction that is the same as the unwinding direction of the polyester filament yarns and of the PTFE filament yarns under a condition of 180 T/m twist are used as warp yarns; polyester yarns of 52 s/4 (454 dtex) fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 190° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 10

Composite yarns obtained by doubling PTFE filament yarns with round section and polyester filament yarns with round section (the difference in dry-hot shrinkage between the polyester filament yarns and the PTFE filament yarns is 5.0%) and twisting in a twisting direction that is the same as the unwinding direction of the polyester filament yarns and of the PTFE filament yarns under a condition of 400 T/m twist are used as warp yarns; polyester yarns of 26 s/2 (454 dtex) fineness are used as weft yarns; the obtained warp yarns and weft yarns are treated by beam-warping and woven on a rapier loom to obtain warp faced satin grey cloth; the obtained grey cloth is post-treated by scouring, water washing, drying, and thermoforming at 190° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 11

Composite yarns obtained by doubling PTFE filament yarns with round section and PPS filament yarns with round section (the difference in dry-hot shrinkage between the PPS filament yarns and the PTFE filament yarns is 3.1%) and twisting in a twisting direction that is the same as the unwinding direction of the PPS filament yarns and of the PTFE filament yarns under a condition of 220 T/m twist are used as warp yarns; PPS yarns of 20 s/2 (562 dtex) fineness are used as weft yarns; the obtained warp yarns and weft yarns are treated by beam-warping and woven on a rapier loom to obtain warp faced satin grey cloth; the obtained grey cloth is post-treated by scouring, water washing, drying, and thermoforming at 200° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 12

Composite yarns obtained by doubling PTFE filament yarns with round section and m-aramid yarns with round section (the difference in dry-hot shrinkage between the m-aramid yarns and the PTFE filament yarns is 2.6%) and twisting in a twisting direction that is the same as the unwinding direction of the m-aramid yarns and of the PTFE filament yarns under a condition of 180 T/m twist are used as warp yarns; m-aramid yarns of 16 s/2 (738 dtex) fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 210° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 13

Composite yarns obtained by doubling PTFE filament yarns with round section and polyester filament yarns with round section (the difference in dry-hot shrinkage between the polyester filament yarns and the PTFE filament yarns is 8.2%) and twisting in a twisting direction that is the same as the unwinding direction of the polyester filament yarns and of the PTFE filament yarns under a condition of 120 T/m twist are used as warp yarns; polyester yarns of 21 s/2 (562 dtex) fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 180° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

EXAMPLE 14

Composite yarns obtained by doubling PTFE filament yarns with round section and polyester filament yarns with round section (the difference in dry-hot shrinkage between the polyester filament yarns and the PTFE filament yarns is 7.5%) and twisting in a twisting direction that is the same as the unwinding direction of the polyester filament yarns and of the PTFE filament yarns under a condition of 550 T/m twist are used as warp yarns; polyester yarns of 26 s/2 (454 dtex) fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 190° C. to obtain the self-lubricating fabric described in the present invention finally; the finally obtained fabric is treated by wet adjustment in an environment at 20±2° C. temperature and 65±4% humidity. The properties of the fabric are assessed and shown in Table 1.

The self-lubricating fabrics produced in the examples 1 to 14 can be applied to mechanical moving parts.

COMPARATIVE EXAMPLE 1

Composite yarns obtained by doubling PTFE filament yarns with irregular polygonal section and polyester filament yarns with irregular polygonal section, which are produced with a tearing electret film method (the difference in dry-hot shrinkage between the polyester filament yarns and the PTFE filament yarns is 2.1%), and twisting in a twisting direction that is the same as the unwinding direction of the polyester filament yarns and of the PTFE filament yarns under a condition of 230 T/m twist are used as warp yarns; polyester filament yarns of 220 dtex fineness are used as weft yarns; the obtained warp yarns and weft yarns are treated by beam-warping and woven on a rapier loom to obtain warp faced twill grey cloth; the obtained grey cloth is post-treated by scouring, water washing, drying, and thermoforming at 200° C. to obtain a fabric finally; the finally obtained fabric is treated by wet adjustment in an environment at 20±2° C. temperature and 65±4% humidity. The properties of the fabric are assessed and shown in Table 2.

COMPARATIVE EXAMPLE 2

PTFE filament yarns with round section are used as warp yarns and weft yarns, and the yarns are woven on a rapier loom to obtain grey cloth with tabby. The obtained grey cloth is post-treated by scouring, water washing, drying, and thermoforming at 210° C. to obtain a fabric finally. The finally obtained fabric is treated by wet adjustment in an environment at 20±2° C. temperature and 65±4% humidity. The properties of the fabric are assessed and shown in Table 2.

COMPARATIVE EXAMPLE 3

P-aramid filament yarns are used as warp yarns, PTFE filament yarns with irregular polygonal section produced with a tearing electret film method are used as weft yarns, and the warp yarns and weft yarns are woven on a rapier loom to obtain weft faced satin grey cloth. The obtained grey cloth is post-treated by scouring, water washing, drying, and thermoforming at 200° C. to obtain a fabric finally. The finally obtained fabric is treated by wet adjustment in an environment at 20±2° C. temperature and 65±4% humidity. The properties of the fabric are assessed and shown in Table 2.

COMPARATIVE EXAMPLE 4

Composite yarns obtained by doubling PTFE filament yarns with round section and polyester filament yarns with round section (the difference in dry-hot shrinkage between the polyester filament yarns and the PTFE filament yarns is 37.5%) and twisting in a twisting direction that is opposite to the unwinding direction of the polyester filament yarns and of the PTFE filament yarns under a condition of 200 T/m twist are used as warp yarns; polyester filament yarns of 220 dtex fineness are used as weft yarns; the obtained warp yarns and weft yarns are treated by beam-warping and woven on a rapier loom to obtain grey cloth with tabby; the obtained grey cloth is post-treated by scouring, water washing, drying, and thermoforming at 180° C. to obtain a fabric finally; the finally obtained fabric is treated by wet adjustment in an environment at 20±2° C. temperature and 65±4% humidity. The properties of the fabric are assessed and shown in Table 2.

COMPARATIVE EXAMPLE 5

Composite yarns obtained by doubling PTFE filament yarns with round section and PPS yarns with round section (the difference in dry-hot shrinkage between the PPS yarns and the PTFE filament yarns is 2.5%) and twisting in a twisting direction that is opposite to the unwinding direction of the polyester filament yarns and of the PTFE filament yarns under a condition of 120 T/m twist are used as warp yarns; PPS yarns of 20 S/2 (590.5 dtex) fineness are used as weft yarns; the obtained warp yarns and weft yarns are treated by beam-warping and woven on a rapier loom to obtain warp faced satin grey cloth; the obtained grey cloth is post-treated by scouring, water washing, drying, and thermoforming at 180° C. to obtain a fabric finally; the finally obtained fabric is treated by wet adjustment in an environment at 20±2° C. temperature and 65±4% humidity. The properties of the fabric are assessed and shown in Table 2.

TABLE 1

| Test Item | | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|
| Warp yarn | 1 | PTFE filament yarn (wet method) | PPS filament yarn | PTFE filament yarn (wet method) | Glass fiber filament yarn | FFP filament yarn (wet method) | P-aramid filament yarn | PTFE filament yarn (wet method) | Polyimide yarn | PTFE filament yarn (wet method) | PTFE filament yarn (wet method) | PTFE filament yarn (wet method) | PTFE filament yarn (wet method) | PTFE filament yarn (wet method) | PTFE filament yarn (wet method) |
| | 2 | Polyester filament yarn | | M-aramid yarn | | Polyester filament yarn | | M-aramid yarn | | Polyester filament yarn | Polyester filament yarn | PPS filament yarn | M-aramid yarn | Polyester filament yarn | Polyester filament yarn |
| Weft yarn | 1 | Polyester yarn | PFA filament yarn (wet method) | M-aramid yarn | PVDF filament yarn (wet method) | Polyester filament yarn | ETFE filament yarn (wet method) | M-aramid yarn | PTFE filament yarn | Polyester yarn | Polyester yarn | PPS yarn | M-aramid yarn | Polyester yarn | Polyester filament yarn |
| | 2 | | PPS filament yarn | | Glass fiber filament yarn | | P-aramid filament yarn | | Polyimide yarn | | | | | | |
| Cross-sectional shape | | Round | Round | Round | Round | Round | Round | Round | Round | Round | Round | Round | Round | Round | Round |
| Fineness of fluorinated resin yarns (dtex) | | 440 | 1330 | 440 | 890 | 890 | 1330 | 440 | 440 | 440 | 440 | 890 | 1330 | 440 | 440 |
| Fineness of other yarns in the composite yarns (dtex) | | 48 | 20 | 147 (40 S) | 220 | 240 | 220 | 98 (60 S) | 147 (40 S) | 110 | 20 | 20 | 98 (60 S) | 110 | 55 |
| Twist of composite yarns (T/m) | | 210 | 200 | 260 | 140 | 160 | 80 | 220 | 250 | 180 | 400 | 220 | 180 | 120 | 550 |
| Fabric texture | | Warp faced satin | Weft faced twill | Warp faced twill | Weft faced twill | Warp faced satin | Weft faced satin | Weft faced twill | Weft faced satin | Warp faced twill | Warp faced satin | Warp faced satin | Warp faced twill | Warp faced twill | Warp faced twill |
| Percentage of surface area of the other yarns (%) | | 9 | 3 | 12 | 17 | 25 | 21 | 28 | 22 | 11 | 5 | 0 | 2 | 29 | 17 |
| Exposed length of the other yarns (mm) | | 1.66 | 0.11 | 0.97 | 0.74 | 2.03 | 0.49 | 1.30 | 2.05 | 2.39 | 0.25 | 0 | 0.19 | 2.78 | 1.25 |
| Ratio of section diameter | | 0.44 | 0.16 | 0.75 | 0.46 | 0.67 | 0.51 | 0.61 | 0.75 | 0.64 | 0.27 | 0.20 | 0.35 | 0.64 | 0.45 |
| Compression elasticity (%) | | 89.1 | 94.4 | 92.2 | 90.8 | 89.0 | 90.5 | 87.5 | 93.1 | 91.3 | 87.6 | 91.7 | 93.0 | 89.5 | 91.2 |
| Shear stiffness (gf/m·deg) | | 8.7 | 7.9 | 9.5 | 11.0 | 13.2 | 14.6 | 10.1 | 8.9 | 9.7 | 6.1 | 7.0 | 12.5 | 9.7 | 8.1 |
| dynamic friction coefficient in warp direction | | 0.046 | 0.083 | 0.060 | 0.080 | 0.079 | 0.083 | 0.088 | 0.075 | 0.065 | 0.051 | 0.041 | 0.055 | 0.089 | 0.069 |
| dynamic friction coefficient in weft direction | | 0.053 | 0.097 | 0.073 | 0.041 | 0.065 | 0.067 | 0.065 | 0.049 | 0.078 | 0.067 | 0.053 | 0.063 | 0.096 | 0.067 |
| Absolute difference between dynamic friction coefficient in warp direction and dynamic friction coefficient in weft direction | | 0.007 | 0.014 | 0.013 | 0.039 | 0.014 | 0.016 | 0.023 | 0.026 | 0.013 | 0.016 | 0.012 | 0.008 | 0.007 | 0.018 |
| Abrasion lifetime (Hr) | | 167 | 136 | 387 | 256 | 192 | 151 | 178 | 209 | 188 | 220 | 341 | 319 | 132 | 170 |

TABLE 2

| Test Item | | Comparative Example 1 | Comparative Example 2 | Comparative Example 3 | Comparative Example 4 | Comparative Example 5 |
|---|---|---|---|---|---|---|
| Warp yarn | 1 | PTFE (tearing electret film method) | PTFE filament yarn | P-aramid filament yarn | PTFE filament yarn (wet method) | PTFE filament yarn (wet method) |
| | 2 | Polyester filament yarn | | | Polyester filament yarn | PPS yarn |
| Weft yarn | 1 | Polyester filament yarn | PTFE filament yarn | PTFE filament yarn | Polyester filament yarn | PPS yarn |
| | 2 | | | | | |
| Cross-sectional shape | | Irregular polygon | Round | Irregular polygon | Round | Round |
| Fineness of fluorinated resin yarns (dtex) | | 480 | 440 | 480 | 220 | 890 |
| Fineness of other yarns in the composite yarns (dtex) | | 220 | — | — | 220 | 454 (26 S/2) |
| Twist of composite yarns (T/m) | | 230 | — | — | 200 | 120 |
| Fabric texture | | Warp faced twill | Tabby | Weft faced satin | Tabby | Warp faced satin |
| Percentage of surface area of the other yarns (%) | | 41 | — | — | 60 | 27 |
| Exposed length of the other yarns (mm) | | 2.67 | — | — | 3.21 | 1.77 |
| Ratio of section diameter | | 0.87 | — | — | 1.29 | 0.94 |
| Compression elasticity (%) | | 71.8 | 80.5 | 73.5 | 79.1 | 87.0 |
| Shear stiffness (gf/m · deg) | | 4.3 | 3.7 | 5.8 | 4.3 | 7.6 |
| Dynamic friction coefficient in warp direction | | 0.110 | 0.094 | 0.191 | 0.107 | 0.083 |
| Dynamic friction coefficient in weft direction | | 0.185 | 0.070 | 0.123 | 0.163 | 0.102 |
| Absolute difference between dynamic friction coefficient in warp direction and dynamic friction coefficient in weft direction | | 0.075 | 0.024 | 0.068 | 0.056 | 0.019 |
| Abrasion lifetime (Hr) | | 1.5 | 1.1 | 2.5 | 12.5 | 43 |

The invention claimed is:

1. A self-lubricating fabric, characterized in that, warp yarns or weft yarns of the fabric are composite yarns formed from fluorinated resin yarns and non-fluorinated resin yarns, a surface area of the non-fluorinated resin yarns on one surface of the fabric takes up 0 to 30% of the total surface area of the composite yarns, and the ratio of a section diameter of the non-fluorinated resin yarns to a section diameter of the fluorinated resin yarns in the composite yarns is 0.12 to 0.80.

2. The self-lubricating fabric according to claim 1, characterized in that, an exposed length of the non-fluorinated resin yarns on a self-lubricating surface of the fabric is 2.5 mm or smaller.

3. The self-lubricating fabric according to claim 2, characterized in that, the surface area of the non-fluorinated resin yarns on one surface of the fabric takes up 2 to 30% of the total surface area of the composite yarns, and the exposed length of the non-fluorinated resin yarns on the self-lubricating surface of the fabric is 0.1 to 2.5 mm.

4. The self-lubricating fabric according to claim 2, characterized in that, the surface area of the non-fluorinated resin yarns on one surface of the fabric takes up 5 to 30% of the total surface area of the composite yarns, and the exposed length of the non-fluorinated resin yarns on the self-lubricating surface of the fabric is 0.2 to 2 mm.

5. The self-lubricating fabric according to claim 1, characterized in that, the fluorinated resin yarns are yarns formed from any one of polytetrafluoroethylene (PTFE), dissoluble PTFE (PFA), polyvinylidene difluoride (PVDF), fluorinated ethylene propylene (FEP), ethylene-tetrafluoroethylene copolymer (ETFE), and polytrifluorochloroethylene (PCTFE) resin.

6. The self-lubricating fabric according to claim 1, characterized in that, the total fineness of the non-fluorinated resin yarns in the composite yarns is 5 to 300 dtex.

7. The self-lubricating fabric according to claim 1, characterized in that, a twist of the composite yarns is 100 to 500 T/m.

8. The self-lubricating fabric according to claim 1, characterized in that, the compression elasticity of the self-lubricating fabric is 85 to 95%.

9. The self-lubricating fabric according to claim 1, characterized in that, the shear stiffness of the self-lubricating fabric is 5 to 15 gf/cm·deg.

10. The self-lubricating fabric according to claim 1, characterized in that, the absolute difference between the dynamic friction coefficient of the self-lubricating fabric in the warp direction and the dynamic friction coefficient of the self-lubricating fabric in the weft direction is 0 to 0.05.

11. The self-lubricating fabric according to claim 1, characterized in that, the continuous abrasion lifetime of the self-lubricating fabric is 100 to 400 h.

12. Use of the self-lubricating fabric according to claim 1 in mechanical moving parts.

13. The self-lubricating fabric according to claim 1, wherein the non-fluorinated resin yarns comprises yarns selected from polyester, p-aramid, m-aramid, polyphenylene sulfide, polyimide, polybenzimidazole (PBI), and glass fiber.

14. A method for producing the self-lubricating fabric according to claim 1, comprising:
(a) preparing base yarns of a fluorinated resin yarn and a non-fluorinated resin yarn;
(b) doubling the fluorinated resin yarn with the non-fluorinated resin yarn, wherein, the difference between the dry-hot shrinkage of the non-fluorinated resin yarn and the dry-hot shrinkage of the fluorinated resin yarn is 0.5 to 30%;
(c) twisting the fluorinated resin yarn and the non-fluorinated resin yarn in a twisting direction that is the same as an unwinding direction of the fluorinated resin yarn and of the non-fluorinated resin yarn under a condition of 50 to 600 T/m twist, to obtain a composite yarn;
(d) using the obtained composite yarns as warp yarns or weft yarns, and carrying out beam-warping and weaving to obtain grey cloth;

(e) processing the obtained grey cloth by scouring, water washing, drying, and thermoforming at 180 to 210° C., so as to obtain a finished product finally.

* * * * *

UNITED STATES PATENT AND TRADEMARK OFFICE
CERTIFICATE OF CORRECTION

PATENT NO. : 10,302,130 B2
APPLICATION NO. : 15/749673
DATED : May 28, 2019
INVENTOR(S) : Youjuan Zhang et al.

It is certified that error appears in the above-identified patent and that said Letters Patent is hereby corrected as shown below:

In the Specification

Column 10, beginning at Line 40, should read:

$$\text{Section diameter } (\mu m) = \sqrt{\frac{\frac{100}{3.14} * \text{fineness(dtex)}}{\text{Density}(g/cm^3)}} * 2$$

Signed and Sealed this
Twenty-fourth Day of December, 2019

Andrei Iancu
*Director of the United States Patent and Trademark Office*